United States Patent
Hosokawa et al.

(10) Patent No.: US 7,103,273 B2
(45) Date of Patent: Sep. 5, 2006

(54) AF DRIVING MECHANISM OF CAMERA

(75) Inventors: Tetsuo Hosokawa, Tokyo (JP); Takuya Hasegawa, Tokyo (JP); Naoki Itou, Chiba (JP)

(73) Assignee: PENTAX Corporation, Tokyo (JP)

( * ) Notice: Subject to any disclaimer, the term of this patent is extended or adjusted under 35 U.S.C. 154(b) by 32 days.

(21) Appl. No.: 10/778,211

(22) Filed: Feb. 17, 2004

(65) Prior Publication Data

US 2005/0105899 A1    May 19, 2005

(30) Foreign Application Priority Data

Feb. 18, 2003   (JP)   ............................ P2003-040062

(51) Int. Cl.
  *G03B 3/10*   (2006.01)
  *G03B 13/00*  (2006.01)
  *G03B 13/34*  (2006.01)

(52) U.S. Cl. .................... 396/144; 396/89; 396/133

(58) Field of Classification Search ................... 396/61, 396/64, 65, 67, 70, 89, 96, 133, 134, 137, 396/159, 529, 531, 535, 72, 79, 83, 144; 348/355, 357, 374, 375
See application file for complete search history.

(56) References Cited

U.S. PATENT DOCUMENTS

| | | | | |
|---|---|---|---|---|
| 4,326,783 A | * | 4/1982 | Kawamura et al. | ......... 396/110 |
| 4,449,807 A | * | 5/1984 | Miki et al. | ................... 396/144 |
| 4,506,968 A | * | 3/1985 | Machmerth | .................. 396/531 |
| RE33,016 E | * | 8/1989 | Ishikawa et al. | ............ 396/110 |
| 4,860,043 A | * | 8/1989 | Kurei et al. | ................. 396/532 |
| 5,030,982 A | * | 7/1991 | Takebayashi | ................. 396/79 |
| 5,079,574 A | | 1/1992 | Ueno | .......................... 396/177 |
| 5,253,004 A | | 10/1993 | Umetsu et al. | ............. 396/177 |
| 6,349,172 B1 | * | 2/2002 | Tanaka et al. | ................. 396/61 |
| 6,571,060 B1 | * | 5/2003 | Moriya et al. | .............. 396/144 |
| 6,594,449 B1 | * | 7/2003 | Fujisaki | ........................ 396/87 |
| 6,714,738 B1 | * | 3/2004 | Kato et al. | .................... 396/535 |

* cited by examiner

*Primary Examiner*—W. B. Perkey
*Assistant Examiner*—Rishi Suthar
(74) *Attorney, Agent, or Firm*—Greenblum & Bernstein, P.L.C.

(57) ABSTRACT

A worm gear is provided on a rotating shaft of an AF motor. A first supporting cylinder includes a gear portion and a receiving portion. A wheel gear, which is in engagement with the worm gear, is formed on an outer surface of the gear portion. A slit is formed at the receiving portion. A second supporting cylinder includes a supported portion which is placed in the receiving portion of the first supporting cylinder, and a receiving portion which supports an AF coupler. A gear is in engagement with a portion which connects the supported portion and the receiving portion of the 2nd supporting cylinder. A clutch spring is wound around the supported portion, being in contact with the outer surface of the supported portion. Both ends of the clutch spring cross each other and are in engagement with a pair of walls, of the slit, which are parallel to an axis of the receiving portion.

4 Claims, 10 Drawing Sheets

AF DRIVING MECHANISM OF CAMERA

BACKGROUND OF THE INVENTION

1. Field of the Invention

The present invention relates to a camera on which an interchangeable lens is mounted.

2. Description of the Related Art

In recent years, in a camera on which an interchangeable lens is mounted, an AF (auto focus) driving mechanism is provided with a multi-point distance measurement unit, which includes a plurality of distance measurement areas. In the multi-point distance measurement unit, an amount and a direction of driving of an AF lens group is calculated based on the result of the distance measurement which is performed at the plurality of distance measurement areas. Therefore, the precision of the auto focusing is improved.

On the other hand, cameras are required to be more compact to improve convenience in manipulating and portability. However, the application of the multi-point distance measurement unit enlarges the AF driving mechanism. This causes a problem, in that enlargement of the AF driving mechanism makes downsizing cameras difficult.

SUMMARY OF THE INVENTION

Therefore, an object of the present invention is to make an interchangeable-lens type camera compact.

In accordance with an aspect of the present invention, there is provided an AF driving mechanism of single lens reflex camera comprising: a motor having at least one portion positioned at the bottom of a camera body, and a rotating shaft of the motor being perpendicular to an optical axis of a lens barrel mounted on the camera body; a worm gear that is provided on the rotating shaft; a first cylindrical member that includes a wheel gear which is in engagement with the worm gear, the wheel gear being formed on an outer surface of the first cylindrical member; an AF coupler that includes a joint portion for connecting to the lens barrel; a second cylindrical member that supports the AF coupler; and a connecting member that connects the first cylindrical member and the second cylindrical member. The AF driving mechanism is provided in a space which is defined by a lower portion of the arc periphery of the lens mount and a tangent of the point which is on the periphery of the lens mount and which is closest to the bottom of the camera body.

Preferably, the rotational force of the motor, which is transmitted through the rotating shaft and the worm gear, is transmitted to the second cylindrical member through the connecting member in a situation where an external force is not acting on the AF coupler.

Preferably, when an external force acts on the AF coupler, the connection of the connecting member with the first and second cylindrical members is released, and the rotational force of the motor, which is transmitted through the rotating shaft and the worm gear, is not transmitted to the second cylindrical member.

For example, the first cylindrical member includes a gear portion on which the wheel gear is formed, and a first receiving portion which supports the second cylindrical member.

The second cylindrical member includes a second receiving portion which supports the AF coupler, the second receiving portion being positioned at one end portion of the second cylindrical member, which is opposite to the other end portion which is supported by the first receiving portion.

The connecting member is a spring which is wound around a portion adjacent to the other end portion of the second cylindrical member, the spring being in contact with the outer surface of the other end portion.

A slit is formed in the first receiving portion of the first cylindrical member along the axes of the first and second cylindrical members.

Both ends of the spring cross each other, and each of the ends is respectively engaged with a pair of wall portions, of the slit, which are parallel to the axes.

According to the present invention, the rotational force of the motor is transmitted to the AF coupler which includes the joint portion for connecting to the lens barrel, by combining the worm gear provided on the rotating shaft of the motor and the wheel gear engaged with the worm gear. Accordingly, it is possible to position the motor such that the rotating shaft is perpendicular to the optical axis of the lens barrel mounted on the camera body.

A feature of the camera body is that the length (width) perpendicular to the optical axis is longer than the length (thickness) along the optical axis. Therefore, due to the above-mentioned arrangement of the motor, the motor does not prevent the thickness of the camera body from being made thinner. Namely, the camera body can be more compact.

Further, the speed reducing mechanism of the worm gear provided on the rotating shaft of the motor independently generates a deceleration larger than that of a gear train which includes a plurality of gears. Accordingly, since it is possible to mount a small motor, the torque of which is small, the camera body can be more compact.

Further, the AF driving mechanism is provided in the space which is defined by the lower portion of the arc periphery of the lens mount and the tangent of the point which is on the periphery of the lens mount and closest to the bottom of the camera body. Accordingly, the space around the lens mount is effectively utilized, and the camera body can be more compact.

Further, when an external force is added to the AF coupler, the connection of the connecting member between the first and second cylindrical members is released and the rotational force of the motor is not transmitted to the second cylindrical member. Therefore, when the AF driving mechanism reaches its limit positions, corresponding to furthest and nearest focusing points, the shock which impacts on each member is softened, and each member is prevented from being broken.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
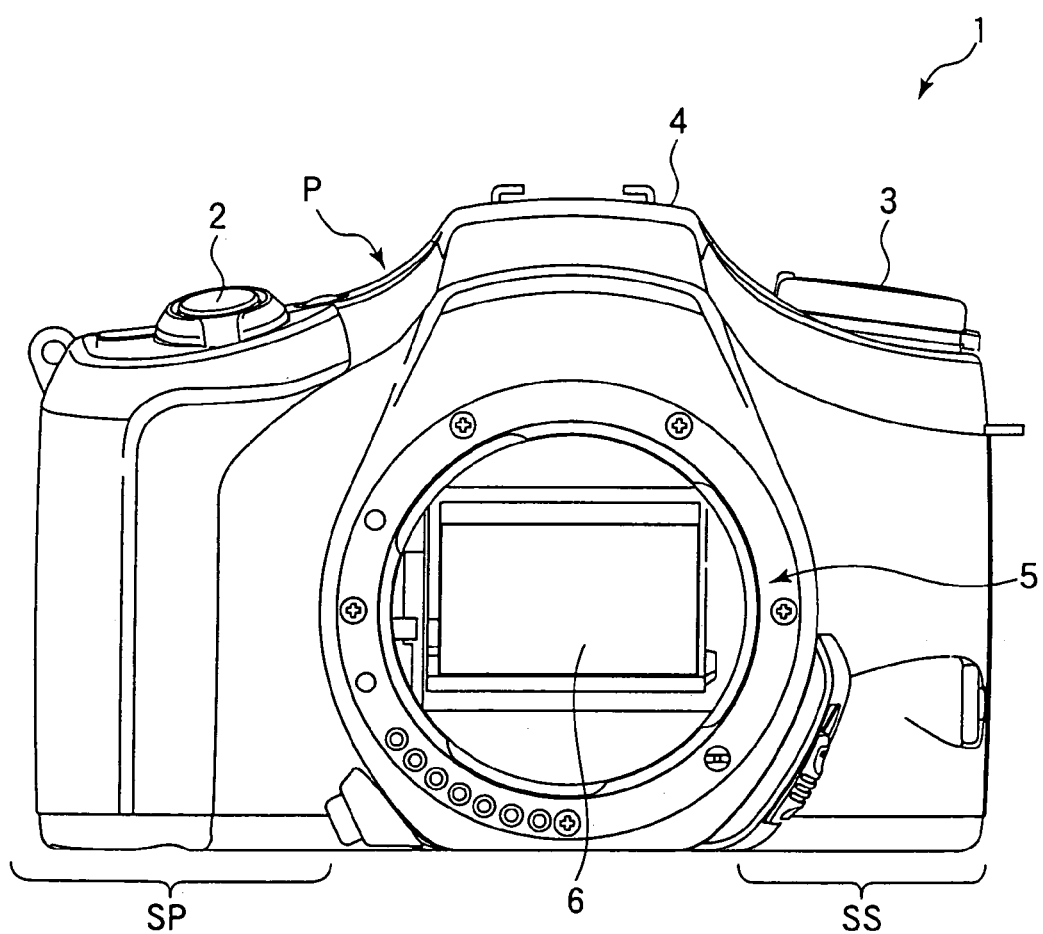
FIG. 1 is a front view of a camera body of a single lens reflex camera to which an embodiment according to the present invention is applied.

The present invention will now be described with reference to an embodiment shown in the drawings.

FIG. 1 is a front view of a camera body 1 of a single lens reflex camera to which an embodiment according to the present invention is applied. An upper casing plate P is placed on the upper side of the camera body 1. A release button 2 is provided on the plate P, being positioned at the left side in FIG. 1. A setting dial 3 for setting various modes is provided on the plate P, being position at the right side in FIG. 1. A flash case 4 is positioned at the center of the plate P. A flash (not shown) is built in the flash case 4, being positioned at the front side end of the camera body 1. The flash case 4 is rotatably supported by a shaft which is provided at the back side end of the camera body 1. When the flash is not used, the flash case 4 is held at a storage position as shown in FIG. 1. When the flash is used, the flash case 4 is rotated around the above-mentioned shaft, the front side end in which the flash is built is moved upwardly, and the flash case 4 is held in an operating position. A lens mount 5 is provided at the center of the camera body 1. A quick return mirror 6 is provided in the camera body 1, being on an optical axis of a lens barrel which is mounted on the lens mount 5.

Figure 2:
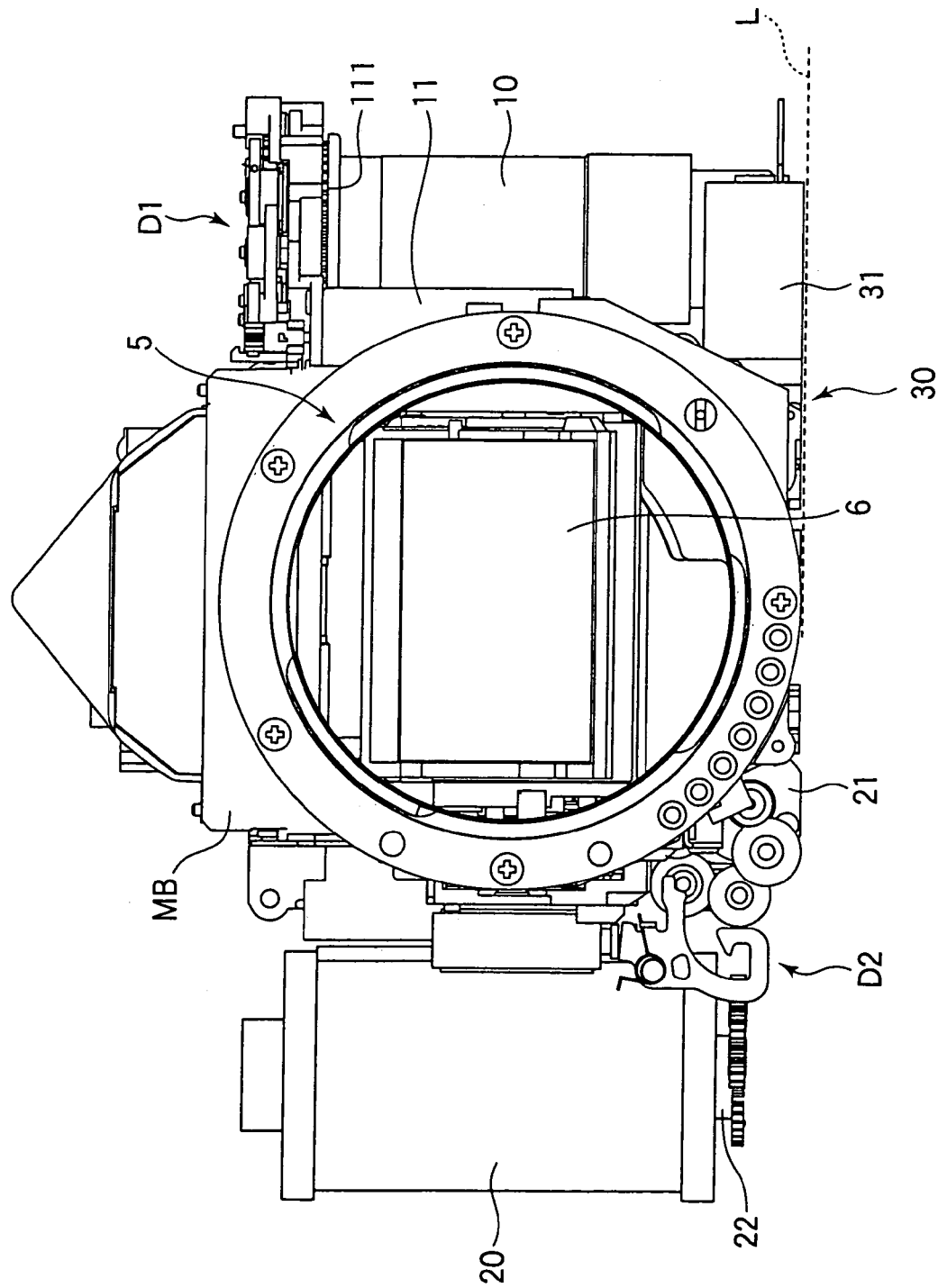
FIG. 2 is a front view of an inside structure of the camera body.
Figure 3:
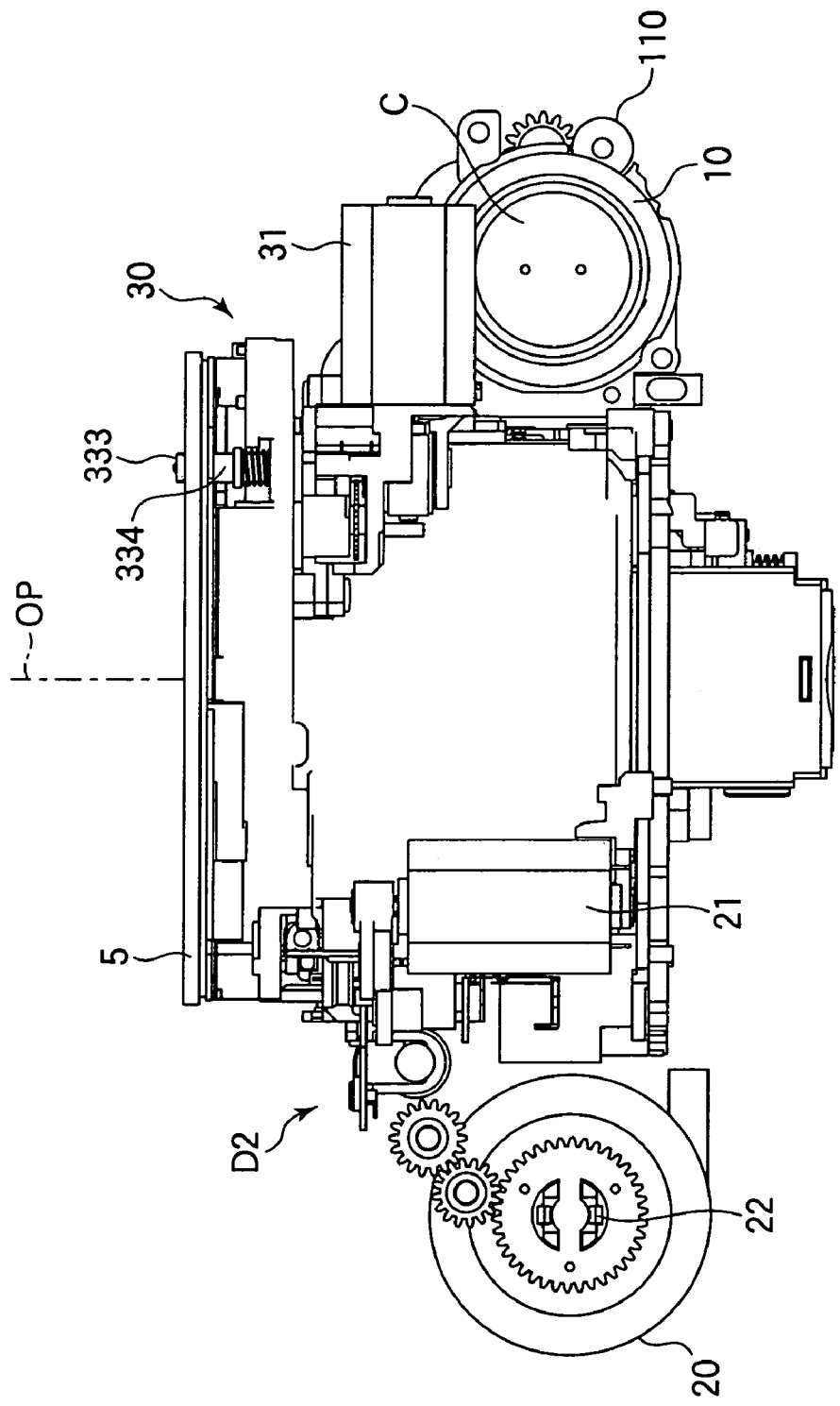
FIG. 3 is a bottom view of the inside structure.
Figure 4:
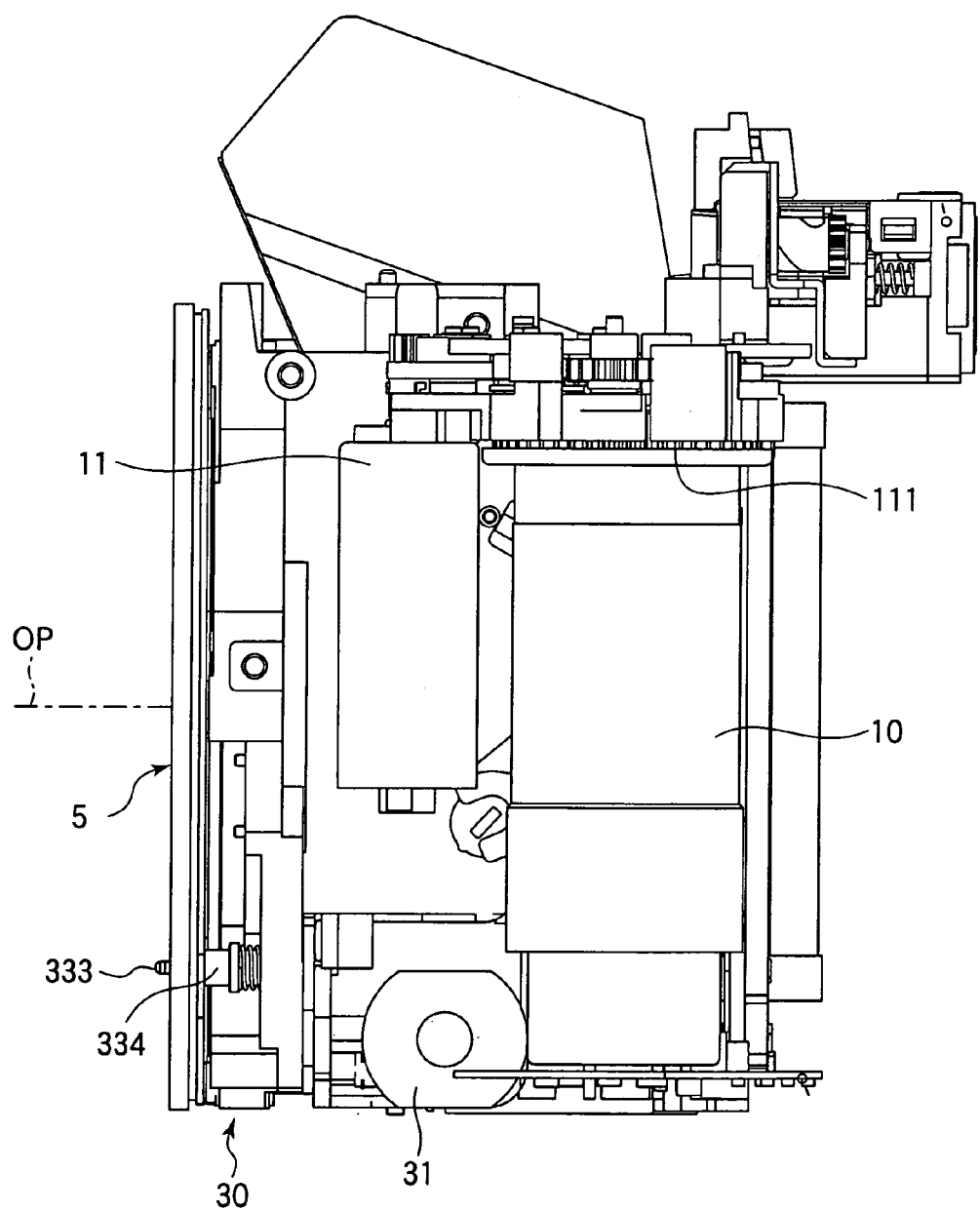
FIG. 4 is a side view of the inside structure, viewed from the right side of FIG. 2.

FIG. 2 is a front view of an inside structure of the camera body, FIG. 3 is a bottom view of the inside structure, and FIG. 4 is a side view of the inside structure, viewed from the right side of FIG. 2. A first motor 11 is provided adjacent to a spool 10. The rotation of the first motor 11 is optionally transmitted to an up-down mechanism of the flash or the spool 10, through a first speed reducing mechanism D1. The transmission of the rotation of the first motor 11 to the spool 10 is performed through a friction gear (not shown), a connecting gear 110, and a spool gear 111 of the spool 10. Alternatively, the rotation of the first motor 11 is transmitted to the up-down mechanism of the flash, namely the driving mechanism of the flash case 4, through a cam gear (not shown). With respect to the rotation of the first motor 11, a first change mechanism (not shown) of the first speed reducing mechanism D1 changes the transmission of the rotational force between the spool 10 and the up-down mechanism. A second motor 21 is provided adjacent to the bottom of the cartridge room 20.

The rotation of the second motor 21 is transmitted to a rewinding fork 22 of the cartridge room 20 and driving mechanisms of the quick return mirror 6, a diaphragm (not shown) and a shutter (not shown). With respect to the rotation of the second motor 21, a second change mechanism (not shown) of a second transmitting mechanism D2 changes the transmission of the rotational force between the rewinding fork 22 and the driving mechanisms.

A controller (not shown) controls the start and stop of rotation and the rotational directions of the first motor 11 and the second motor 21.

An AF driving mechanism 30 is provided at the bottom of the camera body 1, being situated adjacent to the lens mount 5. In other words, as shown in FIG. 2, the AF driving mechanism 30 is provided in a space which is defined by one portion of the arc periphery of the lens mount 5 and a tangent L of the point which is on the periphery of the lens mount 5 and closest to the bottom of the camera body 1.

The AF driving mechanism 30 includes an AF motor 31. As shown in FIG. 3, the AF motor 31 is provided in such a manner that at least one portion of the AF motor 31 is positioned below the spool 10, namely below a spool room (not shown) in which the spool 10 is mounted. Further, the AF motor 31 is positioned in such a manner that its rotating shaft (see FIG. 7) is perpendicular to an optical axis OP of a lens barrel which is mounted on the lens mount 5 (see FIGS. 3 and 4).

Figure 5:
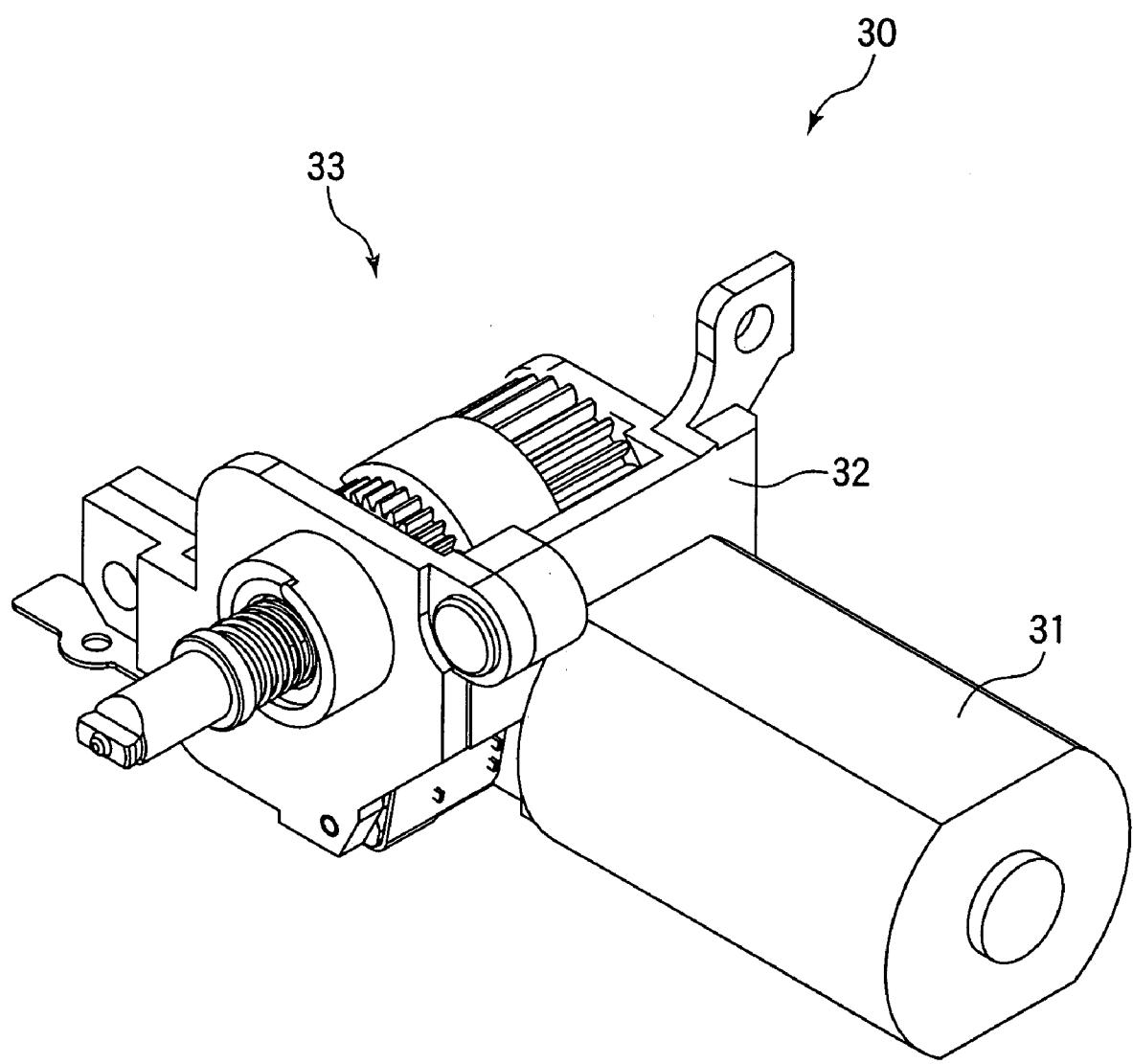
FIG. 5 is a perspective view of an AF driving mechanism.
Figure 6:
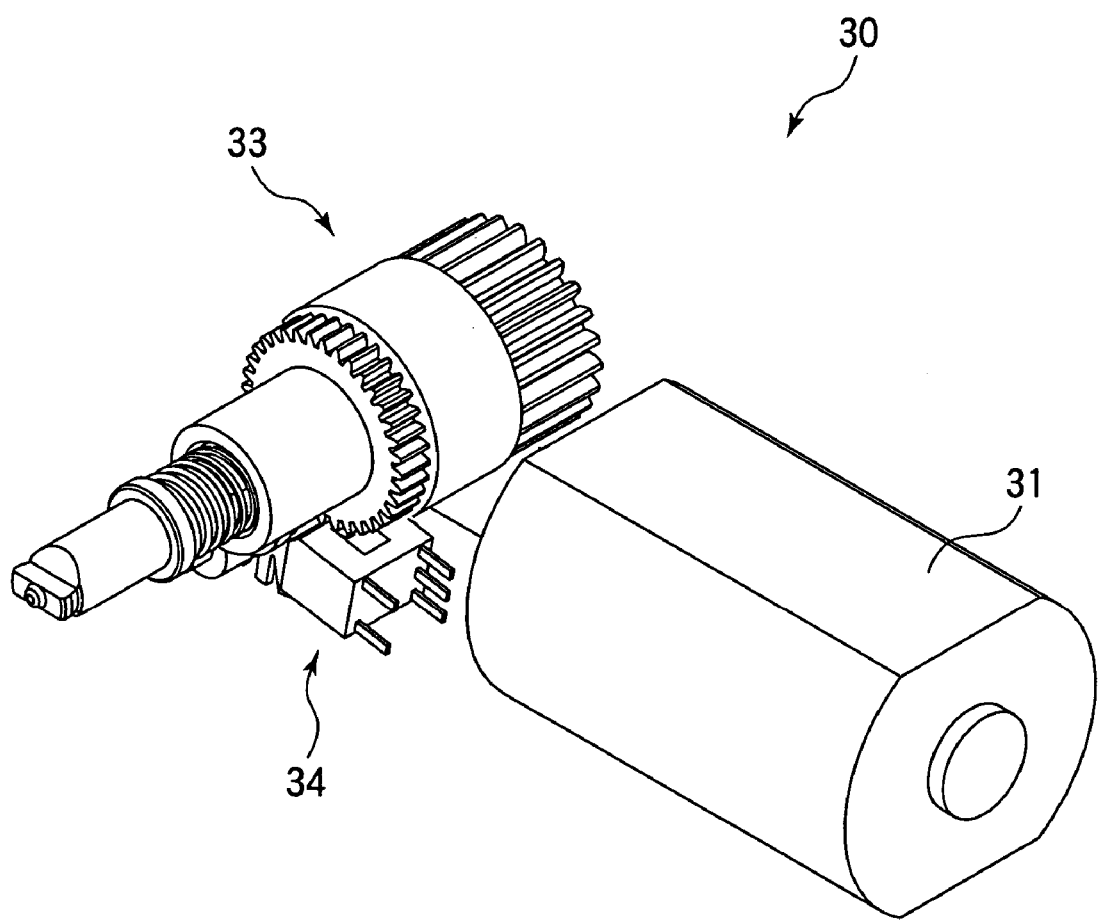
FIG. 6 is a perspective view of the AF driving mechanism, in which a holding case is omitted.

FIG. 5 is a perspective view of the AF driving mechanism 30. A holding case 32 holds the AF motor 31 and a transmitting unit 33. The rotational force of the AF motor 31 is transmitted to a lens barrel which is mounted on the lens mount 5, through the transmitting unit 33. FIG. 6 is a perspective view of the AF driving mechanism, in which the holding case 32 is omitted. As shown in FIG. 6, an AF sensor 34 is provided adjacent to the transmitting unit 33. The AF sensor 34 detects the amount and the direction of rotation of the motor 31.

Figure 7:
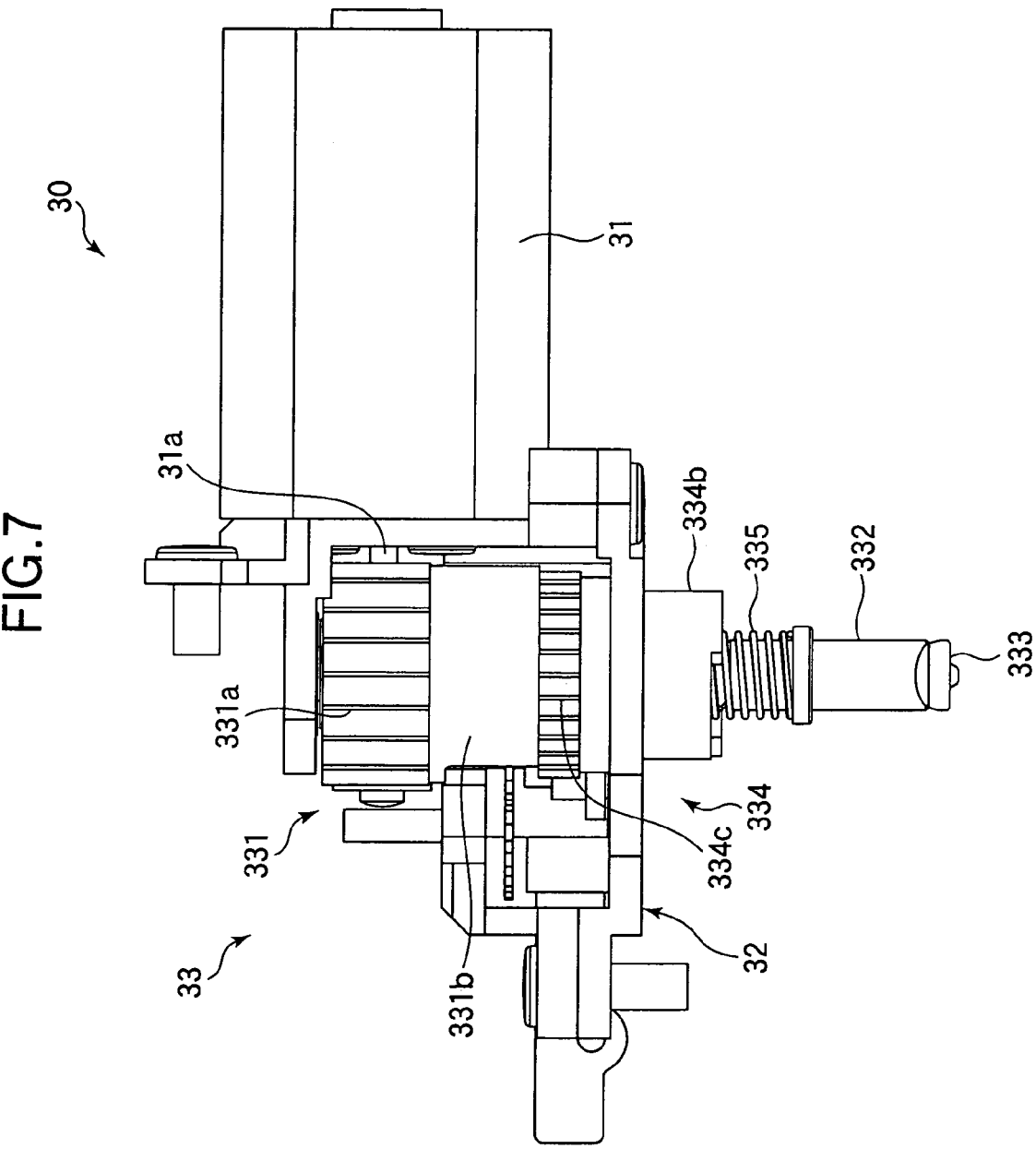
FIG. 7 is a plane view of the AF driving mechanism.
Figure 8:
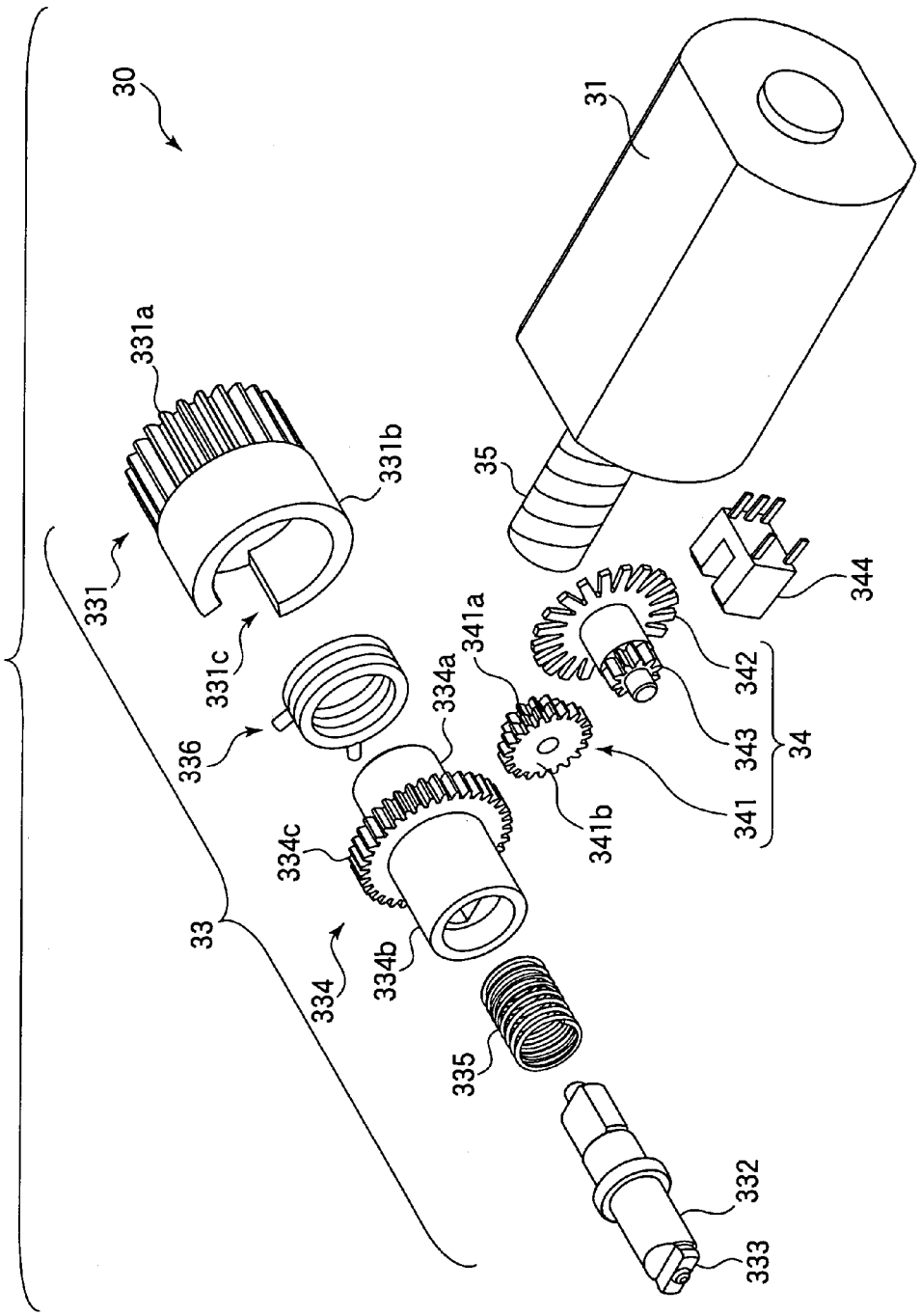
FIG. 8 is an exploded perspective view of the AF driving mechanism.
Figure 9:
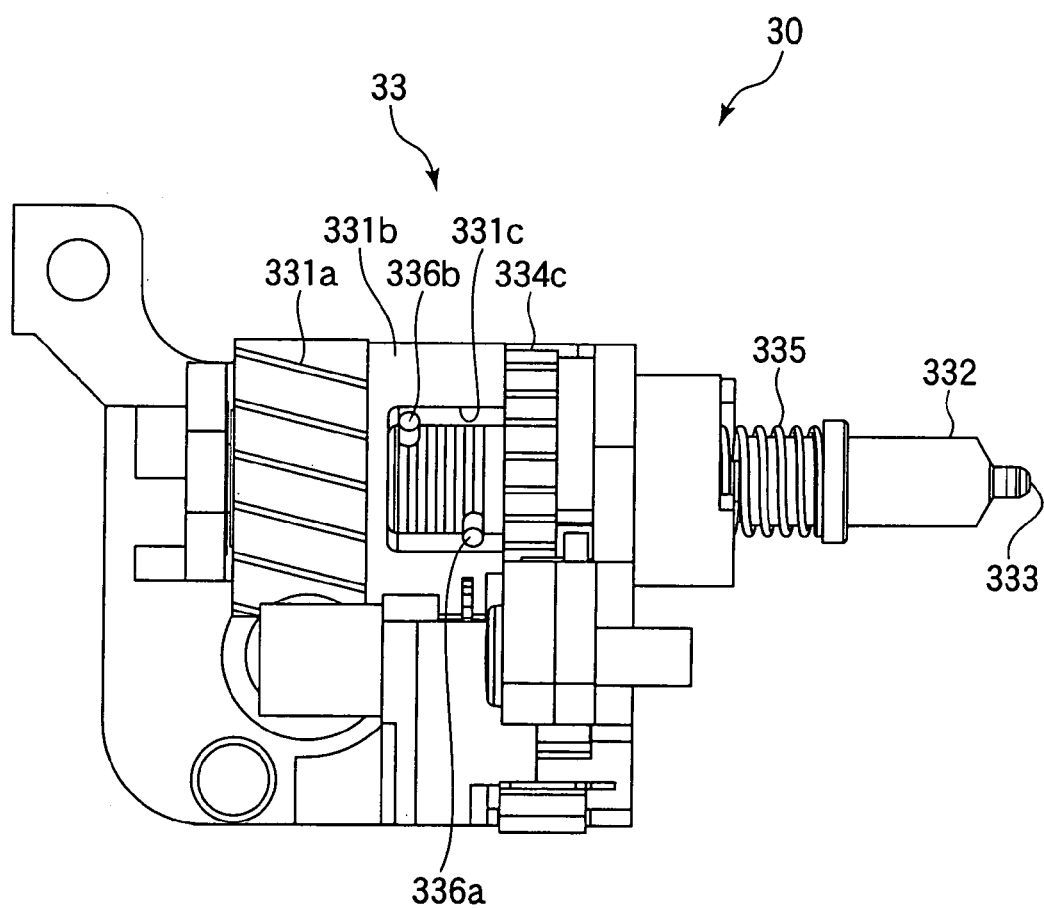
FIG. 9 is a side view of the AF driving mechanism, viewed from a side opposite to the side of an AF motor.

FIG. 7 is a plane view of the AF driving mechanism 30. FIG. 8 is an exploded perspective view of the transmitting unit 33 and the sensor unit 34, in which the AF motor 31 is depicted. FIG. 9 is a side view of the AF driving mechanism 30, viewed from a side opposite to a side at which the AF motor 31 is positioned. A worm gear 35 is fixed at a rotating shaft 31a of the AF motor 31. The transmitting unit 33 includes a first supporting cylinder 331 and a second supporting cylinder 334. The first cylinder 331 is column shaped, and includes a gear portion 331a and a receiving portion 331b. A wheel gear, which is engaged with the worm gear 35, is formed on the outer surface of the gear portion 331a. The receiving portion 331b is approximately column shaped. The receiving portion 331b is a hollow cylinder with a base at one end. A slit 331c is formed in a wall of the receiving portion 331b.

An AF coupler 332 includes a joint portion 333 which is provided at the tip thereof. The AF coupler 332 is situated such that the AF coupler 332 is penetrated through the lens mount 5 and the joint portion 333 is positioned outside. The second supporting cylinder 334 includes a supported portion 334a and a receiving portion 334b. The supported portion 334a is provided in the receiving portion 331b of the first cylinder 331. The receiving portion 334b supports the AF coupler 332. A gear 334c is unitarily formed around a connecting portion between the supported portion 334a and the receiving portion 334b.

A coil spring 335 is wound around an outside surface of a portion, of the AF coupler 332, which is supported by the receiving portion 334b. Accordingly, the AF coupler 332 is urged by the coil spring 335, at all times, such that the joint portion 333 moves away from the second supporting cylinder 334.

Figure 10:
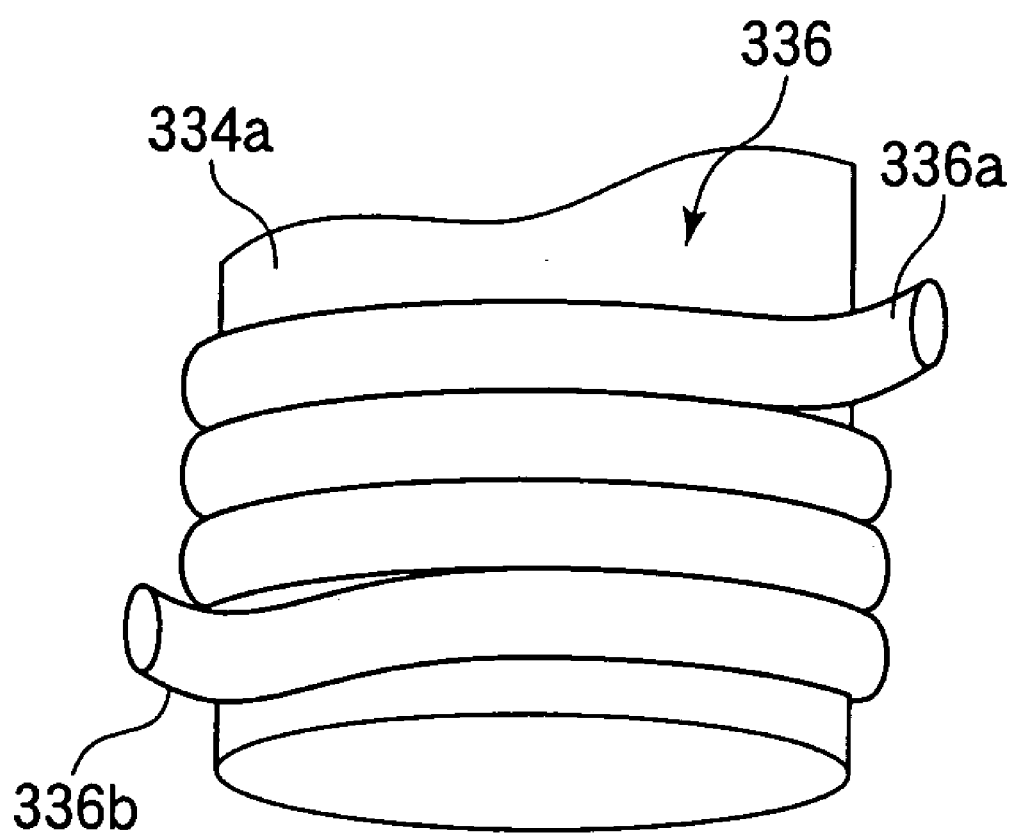
FIG. 10 shows a clutch spring which is securely wound around a supported portion of a second supporting cylinder.

As shown in FIG. 10, a clutch spring 336 is wound the outer surface of the supported portion 334a. The clutch spring 336 is in contact with the outer surface of the supported portion 334a. Both end portions 336a and 336b of the clutch spring 336 cross each other. In a state where the supported portion 334a is provided in the receiving portion 331c of the first supporting cylinder 331, the end portions 336a and 336b of the clutch spring 336 are respectively engaged with walls of the slit 331c, which are parallel to a central axis (longitudinal direction) of the receiving portion 331b. Accordingly, the clutch spring 336 is fixed to the supported portion 334a, and the urging force of the clutch spring 336 works at all times such that the end portions 336a and 336b respectively press the above-mentioned corresponding walls of the slit 331c. Due to this structure, the first and second supporting cylinders 331 and 334 are securely connected through the clutch spring 336, without any external force being added.

While an AF lens group in the lens barrel mounted on the lens mount 5 is being driven between both end positions, corresponding to furthest and nearest focal points, namely, while an external force is not added to the joint portion 333, the first and second supporting cylinders 331 and 334 are prevented from slipping, by means of the clutch spring 336. In other words, the rotational force of the first motor 31 is surely transmitted to the joint portion 333.

When the AF lens driving members reach a limit position, to move the AF lens group to one of the end positions corresponding to the furthest and nearest focal points, stress opposite to the rotational force transmitted by the AF driving mechanism 30 acts on the joint portion 333. In this situation, the motor 31 continues rotating. Accordingly, in accordance with the rotational direction of the motor 31, one of the end portions 336a and 336b of the clutch spring 336 is urged by its engaging wall, of the slit 331c, in a direction opposite to the urging force of the clutch spring 336. Then, the secure engagement between the supported portion 334a and the clutch coil 336 is released. Therefore, regardless of the continuing rotation of the motor 31, only the first supporting cylinder 331 and the clutch coil 336 are rotated, and the rotational force of the motor 31 is not transmitted to the second supporting cylinder 334. Namely, when the AF lens driving members in the lens barrel reach one of their limit positions of their driving range, the shock which the AF lens driving members receive is absorbed. Accordingly, the AF lens and its driving members in the lens barrel are prevented from being broken.

A gear 341 of the sensor unit 34 includes a small-diameter portion 341a and a large-diameter portion 341b. The small-diameter portion 341a is in engagement with a gear 334c of the second supporting cylinder 334. The large-diameter portion 341b is in engagement with a gear 343 which is provided so as to be coaxial with a pulse generator 342. A photo-interrupter 344 is placed such that the teeth of the pulse generator 342 pass between emitting and receiving elements of the photo-interrupter 344. Therefore, by monitoring the output of the photo-interrupter 344, an amount and a direction of rotation of the motor 31 can be detected.

As described above, according to this embodiment, the worm gear 35 is provided on the rotating shaft 31a of the AF motor 31, and the rotational force of the AF motor 31 is transmitted to the AF coupler 332 by combining the worm gear 35 with the wheel gear of the gear portion 331a. Accordingly, the AF motor 31 can be positioned such that the rotating shaft 31a is perpendicular to the optical axis OP of the lens barrel, so that the thickness of the camera body 1 in the direction along the optical axis OP can be reduced.

Further, the worm gear 35 independently provides a deceleration larger than that of the gear train which includes a plurality of gears. Accordingly, the speed reducing mechanism can be compact. Further, since it is possible to mount a small motor, the torque of which is small, the camera body 1 can be compact, too.

Further, generally, a feature of the camera body 1 is that the length (width) perpendicular to the optical axis OP is longer than the length (thickness) along the optical axis OP. Accordingly, the arrangement of the AF motor 31 in this embodiment widens the range of choice regarding size and design of the AF motor 31.

Further, according to this embodiment, since the spaces around the lens mount 5 are practically used, downsizing of the camera body 1 is more effectively developed.

As described above, according to the present invention, since the space around the lens mount can be practically used in the positioning of the AF driving mechanism, the camera body becomes more compact.

The present disclosure relates to subject matter contained in Japanese Patent Application No. 2003-040062 (filed on Feb. 18, 2003) which is expressly incorporated herein, by reference, in its entirety.

The invention claimed is:

1. An AF driving mechanism of a single lens reflex camera comprising:
   a motor at least one portion of which is positioned at the bottom of a camera body, a rotating shaft of said motor being perpendicular to an optical axis of a lens barrel mounted on said camera body;
   a worm gear that is provided on said rotating shaft;
   a first cylindrical member that includes a wheel gear which is in engagement with said worm gear, said wheel gear being formed on an outer surface of said first cylindrical member;
   an AF coupler that includes a joint portion for connecting to said lens barrel;
   a second cylindrical member that supports said AF coupler; and
   a connecting member that connects said first cylindrical member and said second cylindrical member;
   wherein said AF driving mechanism is provided in a space which is defined by a lower portion of the arc periphery of a lens mount and a tangent of the point which is on the periphery of a lens mount and which is closest to the bottom of said camera body.

2. An AF driving mechanism of a single lens reflex camera according to claim 1, wherein the rotational force of said motor, which is transmitted through said rotating shaft and said worm gear, is transmitted to said second cylindrical member through said connecting member in a situation where an external force is not acting on said AF coupler.

3. An AF driving mechanism of a single lens reflex camera according to claim 1, wherein when an external force acts on said AF coupler, the connection of said connecting member with said first and second cylindrical members is released, and the rotational force of said motor, which is transmitted through said rotating shaft and said worm gear, is not transmitted to said second cylindrical member.

4. An AF driving mechanism of a single lens reflex camera according to claim 1, wherein said first cylindrical member includes: a gear portion on which said wheel gear is formed; and a first receiving portion which supports said second cylindrical member,
   said second cylindrical member includes a second receiving portion which supports said AF coupler, said second receiving portion being positioned at one end portion of said second cylindrical member, which is opposite to the other end portion which is supported by said first receiving portion, and
   said connecting member is a spring which is wound around a portion adjacent to the other end portion of said second cylindrical member, said spring being in contact with the outer surface of the other end portion,
   a slit is formed in said first receiving portion of said first cylindrical member along the axes of said first and second cylindrical members, and
   both ends of said spring cross each other, and each of said both ends is respectively engaged with a pair of wall portions, of said slit, which are parallel to said axes.

* * * * *